US012465878B2

(12) United States Patent
Talts et al.

(10) Patent No.: US 12,465,878 B2
(45) Date of Patent: Nov. 11, 2025

(54) APPARATUS FOR FILTERING AMNIOTIC FLUID (71) Applicant: Amniotics AB, Lund (SE)

(72) Inventors: Jan Talts, Staffanstorp (SE); Niels-Bjarne Woods, Furulund (SE)

(73) Assignee: Amniotics AB, Lund (SE)

( * ) Notice: Subject to any disclaimer, the term of this patent is extended or adjusted under 35 U.S.C. 154(b) by 831 days.

(21) Appl. No.: 17/596,770

(22) PCT Filed: Jun. 17, 2020

(86) PCT No.: PCT/SE2020/050631
§ 371 (c)(1),
(2) Date: Dec. 17, 2021

(87) PCT Pub. No.: WO2020/256628
PCT Pub. Date: Dec. 24, 2020

(65) Prior Publication Data
US 2022/0297032 A1 Sep. 22, 2022

(30) Foreign Application Priority Data
Jun. 20, 2019 (SE) .................................... 1930214-0

(51) Int. Cl.
B01D 24/00 (2006.01)
A61B 10/00 (2006.01)
B01D 35/30 (2006.01)

(52) U.S. Cl.
CPC ........ B01D 24/004 (2013.01); A61B 10/0048 (2013.01); B01D 35/306 (2013.01)

(58) Field of Classification Search
CPC ........................... B01D 24/004; B01D 35/306; A61B 10/0048; A61B 2005/1657; A61M 2005/1657
See application file for complete search history.

(56) References Cited

U.S. PATENT DOCUMENTS 4,308,875 A 1/1982 Young
4,567,882 A 2/1986 Heller
(Continued)

FOREIGN PATENT DOCUMENTS

AU 2013204820 B2 5/2013
AU 2013204968 B2 1/2014
(Continued)

OTHER PUBLICATIONS

Anker et al., "Isolation of Mesenchymal Stem Cells of Fetal or Maternal Origin from Human Placenta," Stem Cells, vol. 22, 2004, p. 1338-1345.
(Continued)

Primary Examiner — Thuan D Dang
(74) Attorney, Agent, or Firm — Knobbe, Martens, Olson & Bear, LLP (57) ABSTRACT An apparatus for filtering amniotic fluid containing particulate matter and amniotic cells is disclosed, comprising a filter for filtering the particulate matter from the amniotic fluid, a chamber enclosing the filter, wherein the chamber comprises a fluid inlet and a fluid outlet, and an inlet connector arranged to form a sealing connection between the fluid inlet and an amniotic fluid sample source, wherein, in use, the amniotic fluid pass the filter when flowing from the fluid inlet to the fluid outlet, whereby particulate matter is deposited on the filter and the amniotic fluid flows through the fluid outlet containing amniotic cells.

20 Claims, 7 Drawing Sheets (56) References Cited

U.S. PATENT DOCUMENTS

| | | | |
|---|---|---|---|
| 4,787,894 A | 11/1988 | Turnbull | |
| 5,019,039 A | 5/1991 | Anderson | |
| 5,048,530 A | 9/1991 | Hurwitz | |
| 5,100,387 A | 3/1992 | Ng | |
| 5,137,031 A | 8/1992 | Guirguis | |
| 5,395,379 A | 3/1995 | Deutchman et al. | |
| 5,494,044 A | 2/1996 | Sundberg | |
| 5,713,351 A | 2/1998 | Billings et al. | |
| 5,772,644 A | 6/1998 | Bark et al. | |
| 5,951,497 A | 9/1999 | Wallace et al. | |
| 6,296,764 B1 | 10/2001 | Guirguis et al. | |
| 6,378,523 B1 | 4/2002 | Christopher | |
| 6,461,628 B1 | 10/2002 | Blanchard et al. | |
| 6,479,064 B1 | 11/2002 | Atala | |
| 6,506,574 B1 | 1/2003 | Rambhatla et al. | |
| 6,733,433 B1 | 5/2004 | Fell | |
| 7,255,879 B2 | 8/2007 | Hariri | |
| 7,311,905 B2 | 12/2007 | Hariri | |
| 7,596,385 B2 | 9/2009 | Aghvami et al. | |
| 7,638,141 B2 | 12/2009 | Hariri | |
| 7,682,803 B2 | 3/2010 | Paludan et al. | |
| 7,802,574 B2 | 9/2010 | Schultz | |
| 7,914,779 B2 | 3/2011 | Hariri | |
| 8,987,203 B2 | 3/2015 | Van Leeuwen et al. | |
| 9,868,939 B2 | 1/2018 | Slukvin et al. | |
| 10,073,096 B2 | 9/2018 | Lakshmipathy et al. | |
| 10,143,448 B2 | 12/2018 | Brunner | |
| 10,201,620 B2 | 2/2019 | Meis et al. | |
| 10,983,123 B2 | 4/2021 | Lakshmipathy et al. | |
| 2005/0042595 A1 | 2/2005 | Haas | |
| 2005/0054093 A1 | 3/2005 | Haas | |
| 2005/0059152 A1 | 3/2005 | Tanavde et al. | |
| 2005/0124003 A1 | 6/2005 | Atala et al. | |
| 2005/0148074 A1 | 7/2005 | Davies et al. | |
| 2007/0134210 A1 | 6/2007 | Heidaran | |
| 2007/0243172 A1 | 10/2007 | Ra et al. | |
| 2007/0298497 A1 | 12/2007 | Antwiler | |
| 2008/0064098 A1 | 3/2008 | Allickson | |
| 2009/0191159 A1 | 7/2009 | Sakurada et al. | |
| 2010/0113327 A1 | 5/2010 | Van Leeuwen et al. | |
| 2010/0124569 A1 | 5/2010 | Abbot et al. | |
| 2010/0136679 A1 | 6/2010 | Min et al. | |
| 2010/0260815 A1 | 10/2010 | Kyle et al. | |
| 2010/0323441 A1 | 12/2010 | Maggi et al. | |
| 2010/0323446 A1 | 12/2010 | Barnett et al. | |
| 2011/0184315 A1 | 7/2011 | Chen et al. | |
| 2011/0256110 A1 | 10/2011 | Perin et al. | |
| 2012/0107799 A1* | 5/2012 | Daum | C12Q 1/6806 422/534 |
| 2012/0142102 A1 | 6/2012 | Chen et al. | |
| 2012/0190731 A1 | 7/2012 | Messina | |
| 2013/0157353 A1 | 6/2013 | Dijkhuizen Borgart et al. | |
| 2013/0165816 A1 | 6/2013 | Mor | |
| 2013/0171110 A1 | 7/2013 | Woods et al. | |
| 2014/0038291 A1 | 2/2014 | Ahlfors et al. | |
| 2014/0369968 A1 | 12/2014 | Slukvin et al. | |
| 2015/0025366 A1 | 1/2015 | Harrell | |
| 2015/0247852 A1 | 9/2015 | Lakshmipathy et al. | |
| 2015/0300939 A1 | 10/2015 | Ma | |
| 2016/0030489 A1 | 2/2016 | Larsson et al. | |
| 2016/0068815 A1 | 3/2016 | Larsson et al. | |
| 2016/0199413 A1 | 7/2016 | Simonson et al. | |
| 2017/0273670 A1 | 9/2017 | Rostaing et al. | |
| 2018/0059109 A1 | 3/2018 | Hsuan et al. | |
| 2018/0119104 A1 | 5/2018 | Slukvin et al. | |
| 2018/0250343 A1 | 9/2018 | Reems et al. | |
| 2019/0064164 A1 | 2/2019 | Lakshmipathy et al. | |
| 2020/0048609 A1 | 2/2020 | Saxena et al. | |
| 2020/0056156 A1 | 2/2020 | Ino et al. | |
| 2020/0095551 A1 | 3/2020 | Woods et al. | |
| 2020/0171097 A1 | 6/2020 | Larsson et al. | |

FOREIGN PATENT DOCUMENTS

| | | |
|---|---|---|
| AU | 2014201181 | 3/2014 |
| CN | 1407088 | 4/2003 |
| CN | 101418284 A | 4/2009 |
| CN | 202569006 | 12/2012 |
| CN | 202723948 | 2/2013 |
| CN | 109666645 A | 4/2019 |
| CN | 109777773 A | 5/2019 |
| CN | 109971709 A | 7/2019 |
| DE | 202004012970 | 12/2005 |
| EP | 1029228 A1 | 8/2000 |
| EP | 2302036 | 3/2011 |
| EP | 2479261 | 7/2012 |
| EP | 3029137 | 1/2019 |
| EP | 3117828 | 2/2020 |
| EP | 3886880 A2 | 4/2021 |
| JP | 2005323534 | 11/2005 |
| JP | 2010529851 | 9/2010 |
| JP | 2010265220 | 11/2010 |
| JP | 2011084566 | 4/2011 |
| JP | 2012521780 | 9/2012 |
| JP | 2012255025 | 12/2012 |
| WO | WO 0235992 | 5/2002 |
| WO | WO 03042405 | 5/2003 |
| WO | WO 03068937 | 8/2003 |
| WO | WO 05078073 | 8/2005 |
| WO | WO 06012404 | 2/2006 |
| WO | WO 2008/060139 | 5/2008 |
| WO | WO 2009/031818 | 3/2009 |
| WO | WO 2009/052132 | 4/2009 |
| WO | WO 2009/135206 A1 | 11/2009 |
| WO | WO 10099539 | 9/2010 |
| WO | WO 2012/021845 | 2/2012 |
| WO | WO 2012/070032 | 5/2012 |
| WO | WO 2013/082487 | 6/2013 |
| WO | WO 2014/055121 | 4/2014 |
| WO | WO 2014/089121 A2 | 6/2014 |
| WO | WO 2014/140913 | 9/2014 |
| WO | WO 2015/016761 | 2/2015 |
| WO | WO 2015/023720 | 2/2015 |
| WO | WO 2015/073786 | 5/2015 |
| WO | WO 2016/120310 | 8/2016 |
| WO | WO 2018/073615 | 4/2018 |
| WO | WO 2018/083700 | 5/2018 |
| WO | WO 2018/152364 A1 | 8/2018 |
| WO | WO 2018/169554 | 9/2018 |
| WO | WO 2018/171947 A1 | 9/2018 |
| WO | WO 2018/185584 | 10/2018 |
| WO | WO 2018/186421 | 10/2018 |
| WO | WO 2019/035880 | 2/2019 |
| WO | WO 2019/104381 A1 | 6/2019 |
| WO | WO 2021/076042 A2 | 4/2021 |
| WO | WO 2021/087436 | 5/2021 |

OTHER PUBLICATIONS

Allard et al., "Immunohistochemical Toolkit for Tracking and Quantifying Xenotransplanted Human Stem Cells." Regenerative Medicine 9.4 (2014): 437-452.

Bar-Nur et al., "Epigenetic Memory and Preferential Lineage-Specific Defferation in Induced Pluripotent Stem Clles Derived from Human Pancreatic Isley Bets Cells", Cell Stem Cell vol. 9, No. 1, 2011, pp. 17-23.

Bieback et al., "Clinical Protocols foe the Isolation and Expansion of Mesenchymal Stromal Cells", Transfucion Medicine and Hemotherapy, 2008, vol. 35, pp. 286-294. (Year: 2008).

Bongso et al., "Taking Stem Cells to the Clinic: Major Challenges," Journal of Cellular Biochemisty, vol. 105, 2008, p. 1352-1360.

Bottai et al., "Third trimester amniotic fluid cells with the capacity to develop neural phenotypes and with heterogeneity among subpopulations," Restorative Neurology and Neuroscience, vol. 30, 2012, p. 55-68.

Bossolasco et al., "Molecular and phenotypic characterization of human amniotic fluid cells and their differentiation potential", Cell Research, 2006 16: pp. 329-336.

(56) References Cited

OTHER PUBLICATIONS

Cao et al., Stem Cell Repair of Central Nervous System Injury Neuroscience Res vol. 68, 2002, pp. 501-510.

Carette et al., "Generation of iPSCs from cultured human malignant cells", Blood, vol. 115, No. 20, 2010, pp. 4039-4042.

Chanda et al., "Retinoic Acid Signaling Is Essential for Embryonic Hematopoietic Stem Cell Development", Cell, vol. 155, No. 1, Sep. 26, 2013, pp. 215-227, XP028729738, ISSN: 0092-8674, DOI: 10.1016/J.CELL.2013.08.055.

Cipolleschi et al ("The Role of Hypoxia in the Maintenance of Hematopoietic Stem Cells," Blood, vol. 82, No. 7 (Oct. 1, 1993: pp. 2031-2037).

De Coppi, et al., "Isolation of Amniotic Stem Cell Lines with Potential for Therapy". Nature Biotechnology vol. 25, No. 1 (2007) 100-106.

Dewar et al. "Imatinib inhibits the in vitro development of the monocyte/macrophage lineage from normal human bone marrow progenitors" Leukemia (2003) vol. 17 pp. 1713-1721.

De Wynter et al., "Comparison of Purity and Enrichment of CD34+ Cells from Bone marrow, Umbilical Cord and Peripheral Blood (primed for Apheresis) Using Five Separation Systems", Stem Cells, 1995, vol. 13, pp. 524-532.

Djouad, et al., "Mesenchymal Stem Cells: Innovative Therapeutic Tools for Rheumatic Diseases." Nature Reviews Rheumatology 5.7 (2009): 392-399.

Dobreva et al., "On the origin of amniotic stem cells: of mice and men," The International Journal of Developmental Biology, vol. 54, 2010, p. 761-777.

Eggerman J et al., "Endothelial progenitor cell culture and differentiation in vitro: a methodological comparison using human umbilical cord blood", Cardiovascular Research, Oxford University Press, GB, vol. 58, No. 2, May 1, 2003 (May 1, 2003), pp. 478-486, XP002351441, ISSN: 0008-6363, DOI: 10.1016/S0008-6363(03)00252-9 002351441 I.

Flow Rate Units Conversion, Traditional Oven, 5 pages, retrieved from the internet (May 2022): https://www.traditionaloven.com/tutorials/flow-rate/convert-gtt-drop-per-minute-to-ml-milliliter-per-hour.html (Year: 2022).

Forman et al., Reactive Oxygen Species and Cell Signaling, Respiratory Burst in Macrophage Signaling vol. 166 pp. 54-58, 2002.

Forraz et al., "The umbilical cord: a rich and ethical stem cell source to advance regenerative Medicine," Cell Proliferation, vol. 44, 2011, p. 60-69.

Friedman et al., "Umbilical Cord Mesenchymal Stem Cells: Adjuvants for Human Cell Transplantation," American Society for Blood and Marrow Transplantation, vol. 13, 2007, p. 1477-1486.

Ge et al. "The Size of Mesenchymal Stem Cells is a Significant Cause of Vascular Obstructions and Stroke". Stem Cell Reviews and Reports, Apr. 2014.10(2): 295-303.

Goichberg et al., "cAMP-induced PKC activation increases functional CXCR4 expression on human CD34+ hematopoietic progenitors" Blood, vol. 107, No. 3, Feb. 1, 2006.

Ghosh et al., "Persistnat Donor Cell Gene Expression among Human Induced Pluripotent Stem Cells Contributes to Differences with Human Embryonic Stem Cells", Plos One, vol. 5, No. 2, 2010, p. E8975.

Halliwell, "Cell Culture, Oxidative Stress, and Antioxidants: Avoiding Pitfalls", Biomed J. vol. 37, No. 3, May-Jun. 2014.

Hamid et al., "Highly potent stem cells from full-term amniotic fluid: A realistic perspective" Reprod Biol, 2017, 17(1):9-18; whole document.

Han et al., "Genetically modified mesenchymal stem cell therapy for acute respiratory distress syndrome", stem Cell Res Ther, 2019, 10(1 ):386; whole document.

Hanna et al., "Direct cell reprogramming is a stochastic process amenable to acceleration"., Nature vol. 462, No. 7273, 2009, pp. 595-601.

Hong, D.K., et al., "Combined treatment with Dichloroacetic acid and pyruvate reduces hippocampal neuronal death after transient cerebral ischemia," Frontiers in Neurology, Mar. 2018, vol. 9, Article 137 (in 11 pages).

Hoogduijn et al., "Morphology and Size of Stem Cells From Mouse and Whale: Observational Study." Bmj 347 (2013).

Iizuka, H., et al., "Targeted gene correction of RUNX1 in induced pluripotent stem cells derived from familial platelet disorder with propensity to myeloid malignancy restores normal megakaryopoiesis," Experimental Hematology, 2015, vol. 43, pp. 849-857.

Ikehata et al. "Environmenatal Molecular Mutagenesis", vol. 41, No. 4, 2003, pp. 280-292.

Ikehata et al., "Mutation spectrum in sunlight-exposed", vol. 556, No. 1-2, 2004, pp. 11-24.

Ingram D A et al., "Identification of a novel hierarchy of endothelial progenitor cells using human peripheral and umbilical cord blood", Blood, American Society of Hematology, US, vol. 104, No. 9, Nov. 1, 2004 (Nov. 1, 2004), pp. 2752-2760, XP002351443, ISSN: 0006-4971, DOI: 10.1182/Blood-2004-04-1396 002351443 X.

Kim et al., "Epigenetic memory in induced pluripotent stem cells", vol. 467, No. 7313, 2010, pp. 285-290.

Kim et al., "Time-course transcriptional profiling of human amniotic fluid-derived stem cells using microarray" Cancer Res Treat, 2010, 42(2):82-94; whole document.

Kettle et al ("Mechanism of inactivation of myeloperoxidase by 4-aminobenzoic acid hydrazide," Biochem. J. (1997) 321, 503-508).

Kinney, M.A., et al., "A systems biology pipeline identifies regulatory networks for stem cell engineering," Nature Biotechnology, 2019, vol. 37, pp. 810-818.

Kumano et al., "Generation of Induced pluripotent stem cells from primaty chronic myelogenous leukemia patient samples", Blood vol. 119, No. 26, 2012, pp. 6234-6242.

Kuroda et al. "Treatment of A Full-Thickness Articular Cartilage Defect in the Femoral Condyle of an Athlete with Autologous Bone-Marrow Stromal Cells." Osteoarthritis and Cartilage, vol. 15, No. 2 (2007): 226-231.

Lee et al., "Xenogeneic human umbilical cord-derived mesenchymal stem cells reduce mortality in rats with acute respiratory distress syndrome compl icated by sepsis", Oncotarget, 2017, 8(28):45626-45642; whole document.

Lee et al., "Derivation of neural crest cells from human pluripotent stem cells". Nature protocols 5:88-701 (2010).

Lesage et al., "The amniotic fluid as a source of mesenchymal stem cells with lung-specific characteristics", Wiley Prenatal Diagnosis 2017, pp. 1093-1099.

Li, Yaqing, et al., "Therapeutic effects of amniotic fluid-derived mesenchymal stromal cells on lung injury in rats with emphysema," Respiratory Research (2014) 15:120.

Lindencrona et al., "CD4+ T Cell-Mediated Her-2/Neu-Specific Tunor Rejection In The Absence of B Cells"., Int J Cancer vol. 109, 2004, pp. 259-264.

Lith et al ("Engineering biodegradable polyester elastomers with antioxidant properties to attenuate oxidative stress in tissue," Biomaterials. Sep. 2014 ; 35(28): 8113-8122).

L. M. Reid, "Stem cell biology, hoemone/matrix synergies and liver differentiation". Current Opinion in Cell Biology, vol. 2, 1990, p. 121-130.

Leng et al., "Transplantation of ACE2- Mesenchymal stem Cells Improves the Outcome of Patients with COVID-19 Pneumonia", Aging Dis, Mar. 9, 2020, 11(2):216-228; whole document.

Ma, Q-S., et al., "Ligand-based design, synthesis and biological evaluation of xanthine derivatives as LSD1/KDM1A inhibitors," European Journal of Medicinal Chemistry, 2018, vol. 162, pp. 555-567 (Accepted Manuscript).

Marchetto et al., "Transcriptional Signature and Memory Retention of Human-Induced Pluripotent Stem Cells". Plos One vol. 4, No. 9, 2009, p. E7076.

Masip at al., "Reprogramming with defined factors: from induced pluripotency to induced transdifferentiation"., Molecular Human Reproduction, vol. 16, No. 11 pp. 856-868, 2010.

Melissa Ann Brown et al., "Umbilical Cord Blood Derived Endothelial Progenitor Cells: Isolation, Characterization, and Adhesion Poten- (56) References Cited

OTHER PUBLICATIONS tial in Vitro and in Vivo",, Jan. 1, 2009 (Jan. 1, 2009), XP055140385, Retrieved from the Internet: URL:http://hdl.handle.net/10161/1355 055140385 X.
Mareschi et al., "Multipotent Mesenchymal Stromal Stem Cell Expansion by Plating Whole Bone Marrow at a Low Cellular Density: A More Advantageous Method for Clinical Use", Stem Cells International, 2012, vol. 2012, pp. 1-10. (Year: 2010).
Maurice et al., "Isolation of progenitor cells from cord blood using adhesion matrices", Cytotechnology, 2007, vol. 54, pp. 121-133.
McGuckin et al., "Culture of embryonic-like stem cells from human umbilical cord blood and onward differentiation to neural cells in vitro," Nature Protocols, vol. 3, 2008, p. 1046-1055.
Mizuno et al., "Generation of skeletal muscle stem/progenitor cells from murine induced pluripotent stem cells," The Journal of the Federation of American Societies for Experimental Biology, vol. 24, 2010, p. 2245-2253.
Murphy et al., "Amnion Epithelial Cell Isolation and Characterization for Clinical Use," Current Protocols in Stem Cell Biology, vol. 13, 2010, p. 1-25.
M. V. Wiles, Embryonic Stem Cell Differentiation in vitro Meth. EnzymoIL. vol. 225, 1993, p. 900.
Naik, P. O., et al., "Mitophagy-driven metabolic switch reprograms stem cell fate," Cellular and Molecular Life Sciences, 2018, Sep. 28, vol. 76, pp. 27-43.
Nijboer et al (Targeting the p53 Pathway to Protect the Neonatal Ischemic Brain, Ann Neural 2011; 70:255-264).
Oburoglu, L., et al., "Glucose and Glutamine Metabolism Regulate Human Hematopoietic Stem Cell Lineage Specification," Cell Stem Cell, 2014, vol. 15, pp. 169-184.
O'Donoghue et al., "Fetal stem cells," Best Practice & Research Clinical Obstetrics and Gynaecology, vol. 18, No. 6, pp. 853-875, 2004.
Osanai et al., "Enhanced expression of retinoic acid-metabolizing enzyme CYP26A1 in sunlight-damaged human skin"., vol. 44, No. 4, 2011, pp. 200-206.
Pak, "Regeneration of Human Bones in Hip Osteonecrosis and Human Cartilage in Knee Osteoarthritis With Autologous Adipose-Tissue-Derived Stem Cells: A Case Series." J Med Case Reports 5. 296 (2011).
Okabe et al., "Definitive proof for direct reprogramming of hematopoietic cells to pluripotency", Blood, 2009, vol. 114, No. 9, pp. 1764-1767.
Panopoulos et al.,"Rapid and Highly Efficient Generation of Induced Pluripotent Stem Cells from Human Umbilical Vein Endothelial Cells", Plos One, vol. 6, No. 5, May 16, 2011 (May 16, 2011), p. e19743, XP055035699, DOI: 10.1371/journal.pone.0019743 055035699 X.
Park et al., "Disease-Specific Induced Pluripotent Stem Cells"., Cell vol. 134, No. 5, 2008, pp. 877-886.
Pereira et al., "Reproducible methodology for the isolation of mesenchymal stem cells from human umbilical cord and its potential for cardiomyocyte generation," Journal of Tissue Engineering and Regenerative Medicine, vol. 2, 2008, p. 394-399.
Pelus, L.M., et al., "Peripheral Blood Stem Cell Mobilization: a Look Ahead," Current Stem Cell Reports, 2018, vol. 4, pp. 273-281.
Phuc et al., "Isolation of three important types of stem cells from the same samples of banked umbilical cord blood", Cell Tissue Bank, published online Jun. 8, 2011, vol. 13, pp. 341-351.
Polo et al.,"Cell type of origin influences the molecular and functional properties of mouse induced pluripotent stem cells"., Nature Biotechnology, vol. 28, No. 8, 2010, pp. 848-855.
P.D. Rathjen et al., "Properies and uses of Embryonic Stem Cells Prospects for Application to Human Biology and Gene Therapy" Reprod. Fertil. Dev. vol. 10, 1998, p. 31.
Prigione et al ("The Senescence-Related Mitochondrial/Oxidative Stress Pathway is Repressed in Human Induced Pluripotent Stem Cells," Stem Cells 2010;28:721-733).
Ronn et al., Reactive Oxygen Species Impair the Function of CD90+ Hematopoietic Progenitors Generated from Human Pluripotent Stem Cells. Sep. 1, 2016, vol. 35, No. 1; pp. 197-206; p. 2, $1^{st}$ column, $2^{nd}$ paragraph to $2^{nd}$ column, $2^{nd}$ paragraph; p. 3, $1^{st}$ column, $1^{st}$ and $2^{nd}$ paragraphs; plage 4, $2^{nd}$ column, $2^{nd}$ paragraph; DOI: 10.1002/stem.2503.
Ronn et al., "Retinoic Acid Regulates Hematopoietic Development from Human Pluripotent Development from Human Pluripotent Stem Cells", Stem Cell Reports, vol. 4, No. 2, Feb. 1, 2015, pp. 269-281, XP055333217, United States ISSN: 2213-6711, DOI: 10.1016/j.stemcr.2015.01.009, p. 271, col. 1, paragraph 2.
Robertson, "Teratocarcinomas and embryonic stem cells: A practical approach", 1987, IRL Press Ltd.
Roubelakis, M.G., et al., "In vitro and in vivo properties of distinct populations of amniotic fluid mesenchymal progenitor cells," Journal of Cellular and Molecular Medicine, vol. 15, 2011, p. 1896-1913.
Saguil et al., "Acute Respiratory Distress Syndrome: Diagnosis and Management", American Family Physician, 2012, vol. 85, No. 4, pp. 352-358, 2012.
Spitzhorn et al., "Isolation and Molecular Characterization of Amniotic Fluid-Derived Mesenchymal Stem Cells Obtained from Caesarean Sections", Hindawi Stem Cells International, vol. 2017, Article ID 5932706, in 15 pages.
Salehinejad et al., "Comparison of different methods for the isolation of mesenchymal stem cells from human umbilical cord Wharton's jelly," In Vitro Cell.Dev.Biol.—Animal (2012) 48:75-83.
Saxena et al., "Cyclic AMP Signaling through Epac Axis Modulates Human Hemogenic Endothelium and Enhances Hematopoietic Cell Generation", Stem Cell Reports, vol. 6, No. 5, May 1, 2016, pp. 692-703, XP055333169, United States ISSN: 2213-6711, DOI: 10.1016/j.stemcr.2016.03.006 p. 695, col. 1, paragraph 2; figure 1.
Savickiene et al., "Human Amniotic Fluid Mesenchymal Stem Cells from Second- and Third-Trimester Amniocentesis: Differentiation Potential, Molecular Signature, and Proteome Analysis," Stem Cells International, 2015, in 15 pages.
Schiavo, A.A., et al., "Endothelial properties of third-trimester amniotic fluid stem cells cultured in hypoxia," *Stem Cell Research & Therapy*, (2015) 6:209, p. 1-15.
Seshareddy et al. "Method to Isolate Mesenchymal-Like Cells from Wharton's Jelly of Umbilical Cord," Methods in Cell Biology, vol. 86, 2008, p. 101-119.
Shigemura, T., et al., "Mosaicism of an ELANE mutation in an asymptomatic mother," Journal of Clinical Immunology, Jan. 2019, vol. 39, pp. 106-111.
Suzuki, H., et al., "Glycolytic pathway affects differentiation of human monocytes to regulatory macrophages," Immunology Letters 176: 18-27 (2016), Accepted Manuscript.
Takahashi et al., "Induction of Pluripotent Stem Cells from Mouse Embryonic and Adult Fibroblast Cultures by Defined Factors"., Cell vol. 126, No. 4, 2006, pp. 663-676.
Uchida, N., et al., "Efficient generation of b-globin-expressing erythroid cells using stromal cell-derived induced pluripotent stem cells from patients with sickle cell disease," Stem Cells, 2017, vol. 33, pp. 586-596.
Vadasz et al., "Second and third trimester amniotic fluid mesenchymal stem cells can repopulate a de-cellularized lung scaffold and express lung markers," Journal of Pediatric Surgery, 2014, in 10 pages.
Vega, et al., 2017. "High-Content Image Informatics of the Structural Nuclear Protein Numa Parses Trajectories for Stem/Progenitor Cell Lineages and Oncogenic Transformation". Exp. Cell Res. 351:11-23.
Vodyanik, M.A., et al., "Leukosialin (CD53) defines hematopoietic progenitors in human embryonic stem cell differentiation cultures," Blood, 2006, vol. 108, pp. 2095-2105.
Vizcardo et al. "Regeneration of Human Tumor Anitigen-Specific T Cells from iPSCs Devrived from Mature CD8 T Cells", Cell Stem Cell, Jan. 3, 2013, vol. 12, No. 1, pp. 31-36.
Wang et al ("Calpain inhibitor attenuates ER stress-induced apoptosis in injured spinal cord after bone mesenchymal stem cells X transplantation," Neurochemistry International 97: 15-25 (Jul. 2016).
Wassarman et al., "Guide to Techniques in Mouse Development", Methods in Enzymology vol. 225, 1993.
Weiss et al., "Stem Cells in the Umbilical Cord," Stem Cell Review, vol. 2, 2006, p. 155-162.

(56) References Cited

OTHER PUBLICATIONS

Wilson, Jennifer G., et al., "Mesenchymal Stem (Stromal) Cells for Treatment of Ards: A Phase 1 Clinical Trial", Lancet Respir Med. Jan. 2015; 3(1): 24-32.
Wisniewski et al. (Further phenotypic characterization of the primitive lineage-CD34+CD38-CD90+CD45Ra-hematopoietic stem cell/progenitor cell sub-population isolated from cord blood, mobilized peripheral blood and patients with chronic myelogenous leukemia. Blood Cancer Journal. 2011).
You, Q., et al., "Isolation of human mesenchymal stem cells from third-trimester amniotic fluid," International Journal of Gynecology and Obstetrics, vol. 103, 2008, p. 149-152.
Ye et al., "Human-induced pluripotent stem cells from blood cells of healthy donors and patients with acquired blood disorders"., Blood vol. 114, No. 27, 2009, pp. 5473-5480.
Yu et al., "Induced Pluripotent Stem Cell Lines Derived from Human Somatic Cells"., Science vol. 318, No. 5858, 2007, pp. 1917-1920.
Zhou et al., "Amniotic fluid-derived mesenchymal stem cells: characteristics and therapeutic applications" Arch Gynecol Obstet, 2014, 290(2):223-231; whole document.
Zhou et al., "Generation of human induced pluripotent stem cells from urine samples," Nature Protocols, vol. 7, 2012, p. 2080-2089.
International Search Report and Written Opinion for PCT/US2017/023090 dated Aug. 15, 2017 in 16 pages.
International Search Report and Written Opinion for PCT/IB2016/001628 dated Jan. 24, 2017 in 14 pages.
International Search Report from PCT/SE2020/050993 dated Apr. 15, 2021.
International Search Report from PCT/SE2020/050994, dated Feb. 15, 2021 in 19 pages.
International Search Report in PCT/SE2020/051139 issued Jan. 28, 2021.
International Preliminary Report on Patentability and Written Opinion for PCT/IB2016/001628 dated May 2, 2019 in 8 pages.
International Preliminary Report on Patentability and Written Opinion for PCT/US2017/023090 dated Sep. 26, 2019 in 7 pages.
Supplementary European Search Report in European Patent Application No. 20825113.2, May 9, 2023, in 1 page.
Office Action received in corresponding Chinese Patent Application No. 202080083341.3 issued on May 4, 2023.
Chinese Search Report in Chinese Patent Application No. 202080083341.3, dated Apr. 27, 2023.
Lesage et al., "The amniotic fluid as a source of mesenchymal stem cells with lung-specific characteristics", Prenat Diag, Oct. 15, 2017 (in 21 pages).
Enes et al., "MSC from fetal and adult lungs possess lung-specific properties compared to bone marrow-derived MSC" Scientific Reports, 6:29160, Jul. 6, 2016, pp. 1-10.
International Search Report in PCT/SE2020/050631, issued Oct. 9, 2020.
International Preliminary Report on Patentability in PCT/SE2020/050631, mailed Sep. 17, 2021.
Moraghebi, Roksana, et al., "Term amniotic fluid: an unexploited reserve of mesenchymal stromal cells for reprogramming and potential cell therapy applications," Stem Cell Research & Therapy (2017) 8:190.
Brett, E. et al., "Isolation of CD248-expressing stromal vascular fraction for targeted improvement of wound healing", Accepted Article, doi: 10.1111/wrr.12542.
Enes, S.R. et al., "MSC from fetal and adult lungs possess lung-specific properties compared to bone marrow-derived MSC", Scientific Reports, 2016, vol. 6, No. 1.
Macfadyen, J.R. et al., "Endosialin (TEM1, CD248) is a marker of stromal fibroblasts and is not selectively expressed on tumor endothelium", FEBS Letters 579 (2005) 2569-2575.
O'Donoghue et al., "Amniocentesis in the third trimester of pregnancy," Prenatal Diagnosis, 27(11), pp. 1000-1004, 2007.

\* cited by examiner

APPARATUS FOR FILTERING AMNIOTIC FLUID

TECHNICAL FIELD

The present invention pertains to an apparatus for filtering amniotic fluid and a related method.

BACKGROUND ART

The amniotic fluid is the liquid surrounding and protecting the fetus during pregnancy. This fluid serves as a cushion for the growing fetus, but also serves to facilitate the exchange of nutrients, water, and biochemical products between mother and fetus. It is generated from maternal plasma, and passes through the fetal membranes by osmotic and hydrostatic forces. When fetal kidneys begin to function in about gestational week 16, fetal urine also contributes to the fluid. Amniotic fluid consists of water with electrolytes, but also contains proteins, carbohydrates, lipids, phospholipids, and urea. In addition to metabolic wastes, amniotic fluid also contains fetal cells and other materials chafed off the skin such as hair and vernix. Term amniotic fluid (TAF) collected during a caesarean section contains a number of valuable cells, including Mesenchymal stem cells. However, term amniotic fluid may comprise a number of contaminants that should be removed before any target cells can be processed. This process can be problematic as the TAF is thicker than might be expected, and contains hair and vernix. One problem with previous filtering techniques is ineffective filtering. This makes filtering of larger amounts of TAF difficult. Even if larger filtration units are used there is an inherent problem of clogging, which impedes the filtering capacity. This in turn means that a significant fraction of cells will be trapped and lost in the clogged pores. Further, previous filtering techniques perform inadequate because of the variability between TAF samples in terms of the particulate matter size, and the variability of the particulate matter size within each sample. Complex filtering solutions are not viable when disposable and sterile TAF filters are desired. Previous filtering techniques are also sub-optimal in terms of obtaining a fully aseptic process. The quality of the stem cell samples may thus be negatively impacted, in particular in applications involving a large number of processing steps, e.g. in applications involving preparation of surfactants where several purification steps may be used.

SUMMARY

An objective is to at least partly overcome one or more of the above identified limitations of the prior art.

One objective is to provide an apparatus for filtering amniotic fluid which provides for effective and sterile filtration of the amniotic fluid to obtain amniotic cell samples of high quality.

One or more of these objectives, and other objectives that may appear from the description below, are at least partly achieved by means of an apparatus and a method according to the independent claims, embodiments thereof being defined by the dependent claims.

According to a first aspect, an apparatus for filtering amniotic fluid containing particulate matter and amniotic cells is provided, comprising a filter for filtering the particulate matter from the amniotic fluid, a chamber enclosing the filter, wherein the chamber comprises a fluid inlet and a fluid outlet, and an inlet connector arranged to form a sealing connection between the fluid inlet and an amniotic fluid sample source, wherein, in use, the amniotic fluid pass the filter when flowing from the fluid inlet to the fluid outlet, whereby particulate matter is deposited on the filter and the amniotic fluid, containing amniotic cells, flows through the fluid outlet.

According to a second aspect, a method of filtering amniotic fluid containing particulate matter and amniotic cells is provided, comprising forming a sealing connection between a fluid inlet of a chamber and an amniotic fluid sample source, passing the amniotic fluid through a filter enclosed in the chamber by providing a flow of the amniotic fluid from the fluid inlet to a fluid outlet of the chamber, whereby particulate matter is deposited on the filter and the amniotic fluid flows through the outlet containing amniotic cells.

Further examples of the invention are defined in the dependent claims, wherein features for the first aspect may be implemented for the second aspect, and vice versa.

Some examples of the disclosure provide for an effective filtering of amniotic fluid.

Some examples of the disclosure provide for improved filtering of amniotic fluid containing a greater range in the size of particulate matter.

Some examples of the disclosure provide for reducing the risk of clogging while filtering amniotic fluid.

Some examples of the disclosure provide for a more compact apparatus for filtering of amniotic fluid while maintaining increased filtering capacity.

Some examples of the disclosure provide for a less complex apparatus for filtering of amniotic fluid while maintaining increased filtering capacity.

Some examples of the disclosure provide for obtaining an higher fraction of amniotic cells from a sample of amniotic fluid.

Some examples of the disclosure provide for a sterile filtering of amniotic fluid.

Some examples of the disclosure provide for obtaining amniotic cell samples of high quality.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

These and other aspects, features and advantages of which examples of the invention are capable of will be apparent and elucidated from the following description of examples of the present invention, reference being made to the accompanying drawings, in which.

DETAILED DESCRIPTION OF EXAMPLE EMBODIMENTS

Embodiments of the invention will now be described more fully hereinafter with reference to the accompanying drawings, in which some, but not all, embodiments of the invention are shown. The invention may be embodied in many different forms and should not be construed as limited to the embodiments set forth herein. Throughout the description, the same reference numerals are used to identify corresponding elements.

Figure 1:
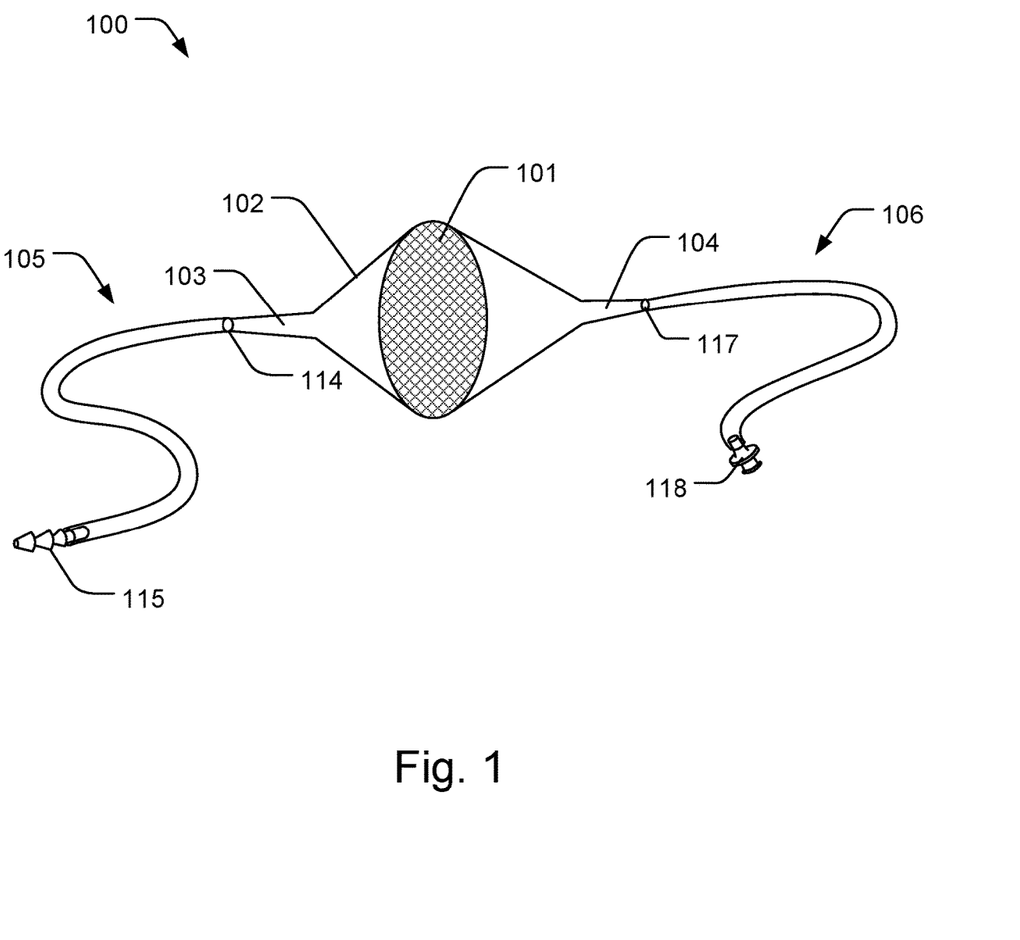
FIG. 1 is a schematic illustration, in a perspective view, of an apparatus for filtering amniotic fluid according to an example.
Figure 10A:
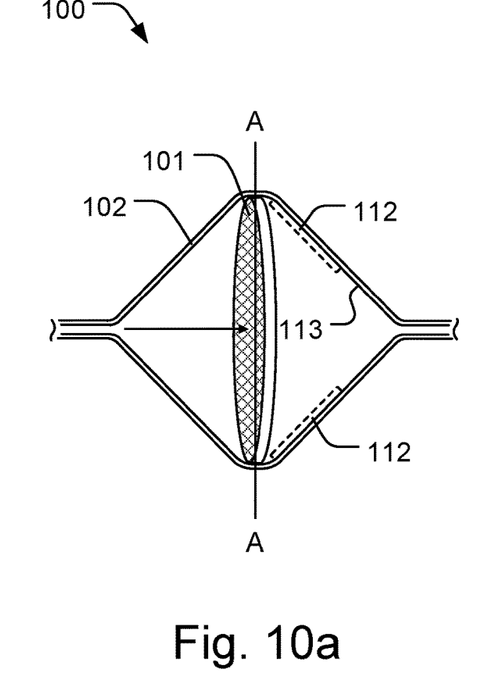
FIG. 10a is a schematic illustration, in a cross-sectional side view, of an apparatus for filtering amniotic fluid according to an example.
Figure 10B:
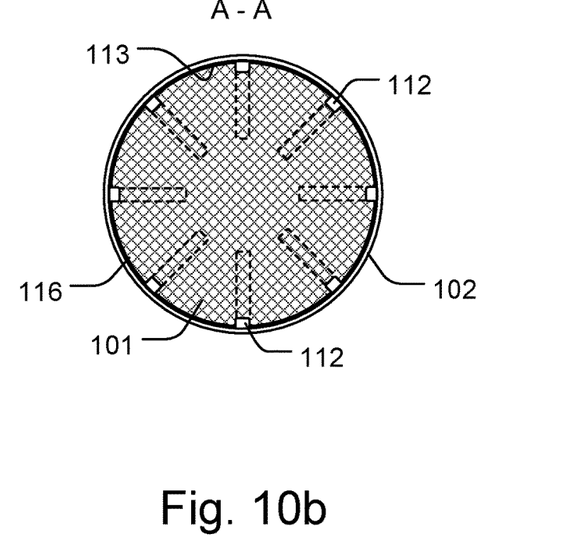
FIG. 10b is a schematic illustration, along a cross-section A-A in FIG. 10a, of an apparatus for filtering amniotic fluid according to an example.

FIG. 1 is a schematic illustration of an apparatus 100 for filtering amniotic fluid according to one example. The amniotic fluid contains amniotic cells, originating from the fetus or the amniotic sac, such as Mesenchymal stem cells. The amniotic fluid also contains other materials chafed off the skin such as hair and vernix. Material other than the amniotic cells are here referred to as particulate matter. The amniotic fluid thus generally contains a mixture of amniotic cells and particulate matter. The apparatus 100 comprises a filter 101 for filtering the particulate matter from the amniotic fluid, and a chamber 102 enclosing the filter 101. The chamber 102 comprises a fluid inlet 103 and a fluid outlet 104. In one example, the chamber 102 has only fluid inlet 103 and fluid outlet 104 and no further inlets or outlets. The chamber 102 enclosing the filter 101 should be construed as the filter 101 being isolated by the chamber towards the environment surrounding the chamber 102 such that there is no fluid communication between the amniotic fluid in the chamber 102 with said environment. In one example, the filter 101 is sealed within the chamber 102. Preferably, the chamber 102 is sealed from the environment. Fluid communication through the chamber 102 is thus controlled via the fluid inlet 103 and the fluid outlet 104 in the example of FIG. 1. The filter 101 is attached to inside of the chamber 102 between the fluid inlet 103 and the fluid outlet 104. FIG. 10b shows an example of a cross-section A-A as indicated in FIG. 10a of a circular chamber 102 and filter 101. It should however be understood that the chamber 102 and filter 101 may have varying shapes for optimization to different applications.

Figure 2:
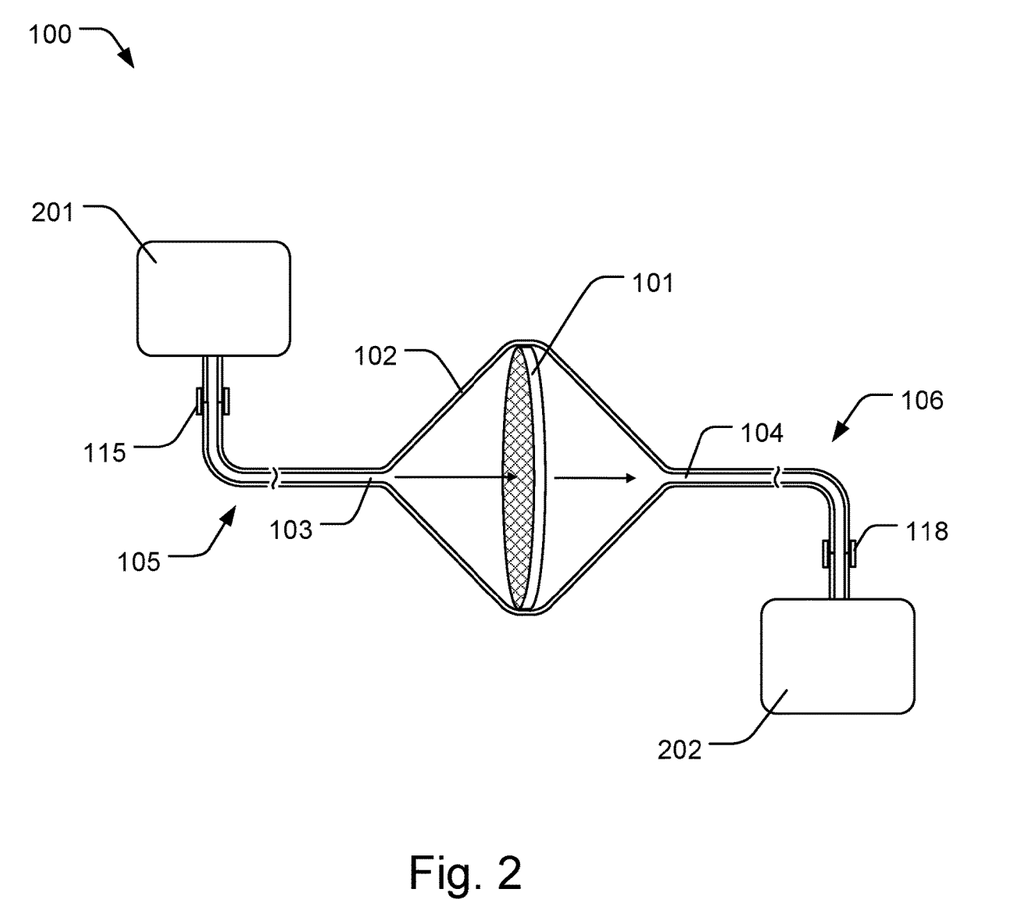
FIG. 2 is a schematic illustration, in a cross-sectional side view, of an apparatus for filtering amniotic fluid according to an example.

The apparatus 100 comprises an inlet connector 105 arranged to form a sealing connection between the fluid inlet 103 and an amniotic fluid sample source 201. FIG. 2 shows a schematic example of such source 201 of amniotic fluid. Having an inlet connector 105 connected to the fluid inlet 103 and configured to provide a sealing connection between the fluid inlet 103 directly to a source 201 of amniotic fluid provides for minimizing exposure to contaminants and an efficient aseptic handling of the amniotic fluid. This facilitates obtaining amniotic cells which allows post-filtration processing at an improved quality standard. Hence, an aseptic pharmaceutical production process is facilitated. The preparation of e.g. surfactant molecules may be facilitated. The apparatus 100 provides for improving the functioning of the amniotic stem cells, such as an improved engraftment phase following transplantation. Such improved processes are enabled by having the filter 101 enclosed in a chamber 102 and an inlet connector 105 arranged to form a sealing connection preferably using sterile connectors between the fluid inlet 103 of the chamber 102 and an amniotic fluid sample source 201. The risk of exposing the amniotic stem cells to contaminants, such as bacteria and viruses, is thus reduced. The filtration device may be made in a pliable material, e.g. soft plastic material such as polyvinyl chloride or low density polyethelyne, and it can be devoid of air, and thus oxygen, before use. When amniotic fluid is transported into the chamber 102, the chamber may expand and allow filtration through filter 101. Exposure to oxygen is therefore minimized, which provides for reducing formation of oxygen free radicals which may have a negative impact the functioning of the stem cells.

FIG. 1 shows an example where the inlet connector 105 comprises a tube 105 connected to the fluid inlet 103 at a first sealing connection 114. The inlet connector 105 may form a sealing connection with the fluid inlet 103 with a force-fitting connection, an adhesive, a clamp, or other fixation elements. In another example, such as schematically shown in FIG. 2, the inlet connector 105 is a continuous extension of the fluid inlet 103, without a separate fixation element, e.g. by being formed as a single piece by molding or other material forming techniques. FIGS. 1 and 2 show a second connector 115 configured to form a sealing connection with a sample source 201, such as a container or bag 201 containing amniotic fluid. The second connector 115 may comprise releasable force-fitting connection, a clamp, or a combination thereof, or other releasable fixation elements. The chamber 102, filter 101, fluid inlet 103, fluid outlet 104, and inlet connector 105 may be provided as an kit in a sterile packaging, e.g. as a disposable kit. Such kit, i.e. apparatus 100, thus provides for a facilitated and improved process of filtering and obtaining amniotic stem cells. Hence, in use, the amniotic fluid pass the filter 101 when flowing from the fluid inlet 103 to the fluid outlet 104. The particulate matter is thus deposited on the filter 101 and the amniotic fluid containing the amniotic cells flows through the fluid outlet 104.

As seen in the example in FIG. 10b, the filter 101 may be connected around its periphery 116 to the inner wall 113 of the chamber 102. This provides for avoiding passing of amniotic fluid from the inlet 103 to the outlet 104 without being filtered. The filter 101 may be tensioned or otherwise supported so that a folding or curving of the filter 101 in the chamber 102 is avoided. This provides for maintaining a defined mesh or pore size across the area of the filter 101 and thus defined filtering characteristics. Maintaining a defined mesh or pore size also provides for reducing the risk of clogging the filter 101. Long-term performance may accordingly be improved.

The apparatus 100 may comprise an outlet connector 106 to form a sealing connection between the outlet and an amniotic cell-receiving device 202, such as a centrifuge or other amniotic cell-processing equipment downstream of the apparatus 100. FIG. 2 shows a schematic example of such device 202. This provides for minimizing exposure to contaminants and an efficient aseptic handling of the amniotic fluid in post-filtering processing steps. FIG. 1 shows an example where the outlet connector 106 comprises a tube 106 connected to the fluid outlet 104 at a first sealing connection 117. The outlet connector 106 may form a sealing connection with the fluid outlet 104 with a force-fitting connection, an adhesive, a clamp, or other fixation elements. In another example, such as schematically shown in FIG. 2, the outlet connector 106 is a continuous extension of the fluid outlet 104, without a separate fixation element, e.g. by being formed as a single piece by molding or other material forming techniques. FIGS. 1 and 2 show a second connector 118 configured to form a sealing connection with an amniotic cell-processing device downstream of the apparatus 100, such as a centrifuge 202. The second connector 118 may comprise a force-fitting connection, a clamp, a combination thereof, or other releasable fixation elements. The connection between the second connector 118 and e.g. a centrifuge 202 may thus be repeatedly connected and disconnected, and also re-sealable to maintain a sealing connection in such procedure. The chamber 102, filter 101, fluid inlet 103, fluid outlet 104, inlet connector 105, and outlet connector 106 may be provided as a kit in a sterile packaging, e.g. as a disposable kit. Such kit, i.e. apparatus 100, thus provides for a facilitated and improved process of filtering and processing of amniotic stem cells.

Figure 4:
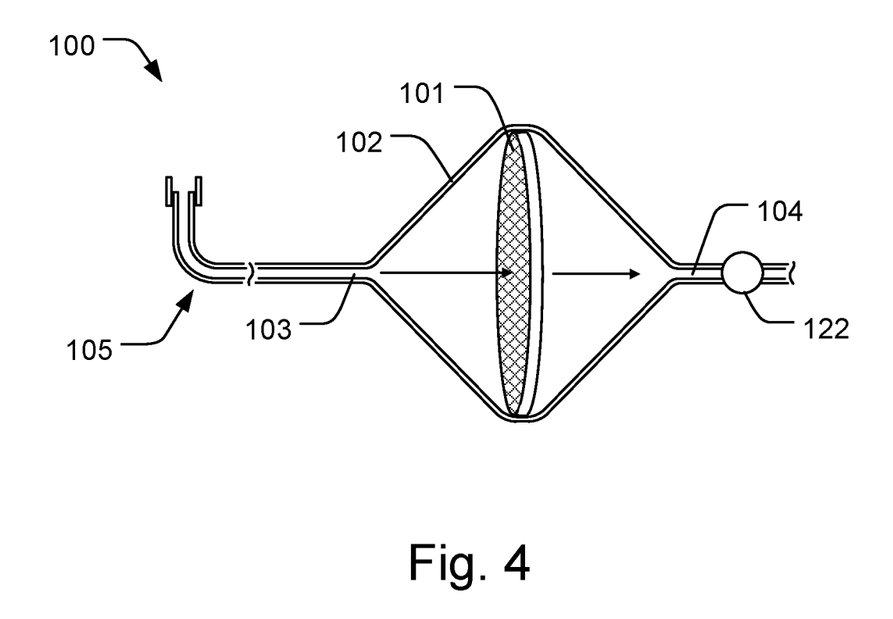
FIG. 4 is a schematic illustration, in a cross-sectional side view, of an apparatus for filtering amniotic fluid according to an example.
Figure 5:
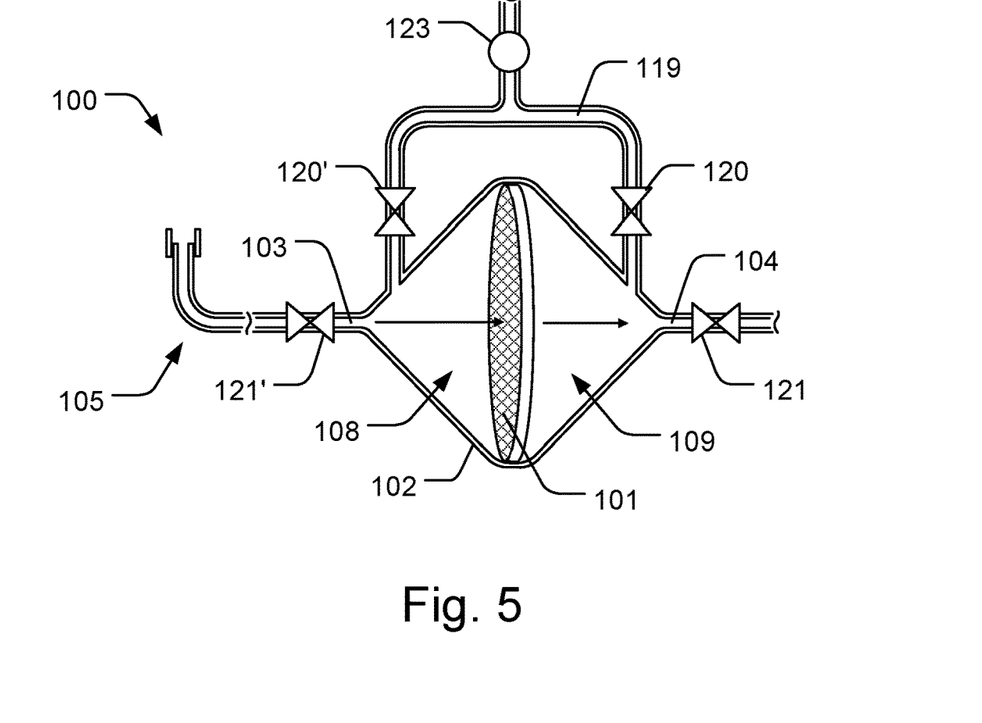
FIG. 5 is a schematic illustration, in a cross-sectional side view, of an apparatus for filtering amniotic fluid according to an example.

The apparatus 100 may comprise a pump 122, 123, arranged to pressurize the amniotic fluid to flow from the fluid inlet 103 to the fluid outlet 104. This provides for a more effective filtering of the amniotic fluid. Larger volumes may be filtered in less time. FIG. 4 shows an example where a pump 122 is connected to the fluid outlet 104 to draw amniotic fluid through the filter 101 in the direction of the indicated arrows. It is also conceivable that the pump 122 may be arranged at the fluid inlet 103 to push the amniotic fluid through the filter 101. The pump 122 may be a compact manually operated pump integrated with the fluid inlet 103, fluid outlet 104, inlet connector 105, or outlet connector 106. FIG. 5 shown another example, described in more detail below, where a pump 123 arranged to pressurize the amniotic fluid to flow from the fluid inlet 103 to the fluid outlet 104.

Figure 3:
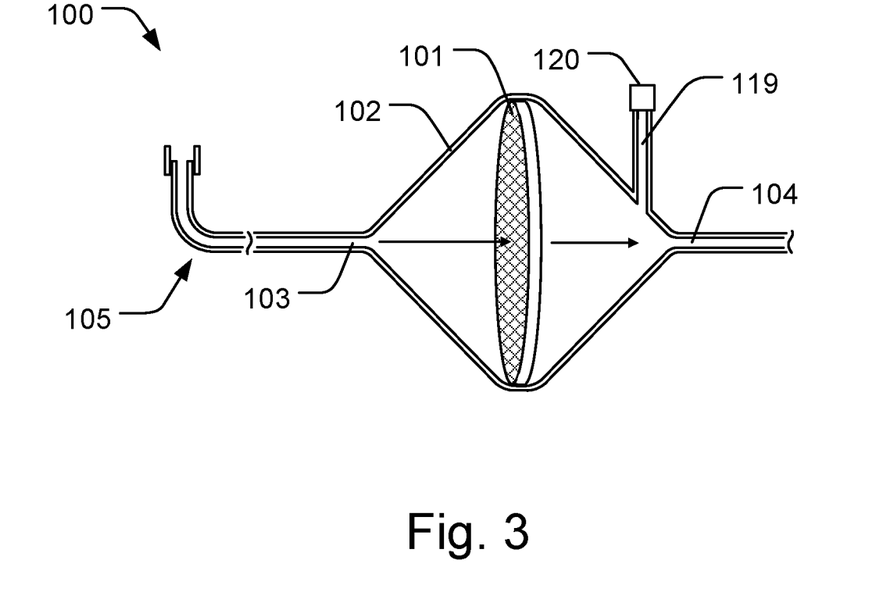
FIG. 3 is a schematic illustration, in a cross-sectional side view, of an apparatus for filtering amniotic fluid according to an example.

The chamber 102 may comprise a conduit 119 arranged between the fluid inlet 103 and the fluid outlet 104. A pressure in the chamber 102 may be variable in response to fluid and/or gaseous communication through the conduit 119. The flow of amniotic fluid through the filter 101 may thus be optimized depending on the application, e.g. the flow rate through the filter 101 may be increased or decreased by varying the pressure in the chamber 102 via conduit 119. FIG. 3 shows an example where a conduit 119 is in communication with the chamber 102. An access port 120, such as a connector or valve element, may be actuated to allow a fluid or gas to be expelled from the chamber 102, and/or injected into the chamber 102, to affect the pressure therein. The conduit 119 is arranged between the fluid outlet 103 and the filter 101 in FIG. 3, but it is conceivable that the conduit 119 may be arranged between the fluid inlet 103 and the filter 101 in another example. FIG. 5 as described below shows a further example of a conduit 119 in communication with the chamber 102.

A pump 123 may be arranged in communication with the conduit 119, as exemplified in the schematic illustration of FIG. 5. This provides for facilitating optimization of the flow in the chamber 102 and the associated filtering process. In the example of FIG. 5 the conduit 119 is in variable communication with an upstream cavity 108 of the chamber 102 and a downstream cavity 109 of the chamber 102. I.e. the filter 101 may be arranged to divide the chamber 102 into an upstream cavity 108 and a downstream cavity 109. In FIG. 5 the conduit 119 is connected to both the upstream cavity 108 and the downstream cavity 109. The pump 123 is arranged to pressurize the amniotic fluid to flow from the upstream cavity 108 to the downstream cavity 109, or to flow from the downstream cavity 109 to the upstream cavity 108. The latter case may be advantageous in some situation when a momentary reversed flow is desired, e.g. to clear out clogging or occlusion of the filter 101. In such case, valves 120, 120', 121, 121', as schematically indicated in FIG. 5 are operated to provide the desired flow directions. E.g. for a reversed flow, valves 120 and 121' may be open and valves 120' and 121 may be closed. Valves 121, 121', may be open and valves 120, 120', may be closed in a normal filtering mode. The upstream cavity 108 may be pressurized by also opening valve 120' in such filtering mode.

Figure 6:
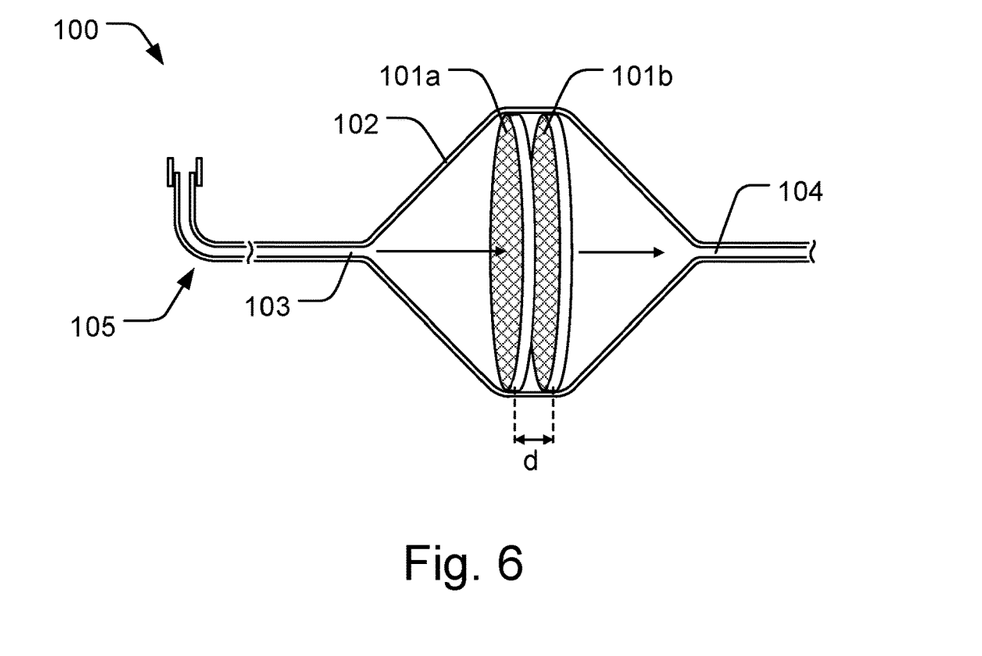
FIG. 6 is a schematic illustration, in a cross-sectional side view, of an apparatus for filtering amniotic fluid according to an example.

The filter 101 may comprise a first filter element 101a and a second filter element 101b arranged between the first filter element 101a and the fluid outlet 104, as schematically shown in the example of FIG. 6. The second filter element 101b may have a mesh or pore size which is smaller than a mesh or pore size of the first filter element 101a. This provides for an effective filtering of particulate matter of gradually smaller dimensions. The risk of filter occlusion is thus reduced. This allows for a more reliable and robust filtering process of the amniotic fluid. An improved filtering of amniotic fluid containing a greater range in the size of particulate matter is provided. Further, a larger fraction of the stem cells in the amniotic fluid may be obtained since the stem cells are not lost in clogged pores. Although FIG. 6 shows an example with two filter elements 101a, 101b, it should be understood that any plurality of filter elements may be arranged in sequence in the chamber 102, with gradually decreasing mesh or pore size, in the direction of fluid flow from the fluid inlet 103 to the fluid outlet 104, for an effective filtering of particulate matter of gradually decreasing dimensions.

The first and second filter elements 101a, 101b, may be separated by a distance (d) along a direction amniotic fluid flow from the fluid inlet 103 to the fluid outlet 104, as schematically indicted in the example of FIG. 6. The motion of the amniotic fluid between the first and second filter elements 101a, 101b, which in some case may involve turbid flow, may provide for further reducing the risk of unwanted build-up of particles on the first and second filter elements 101a, 101b.

The filter 101 may comprise a mesh having a mesh size in the range of 20-2000 µm. In another example, the filter 101 comprises a mesh having a mesh size in the range of 100-500 µm. This provides for a particularly effective filtration of particulate matter from the amniotic fluid.

Figure 7:
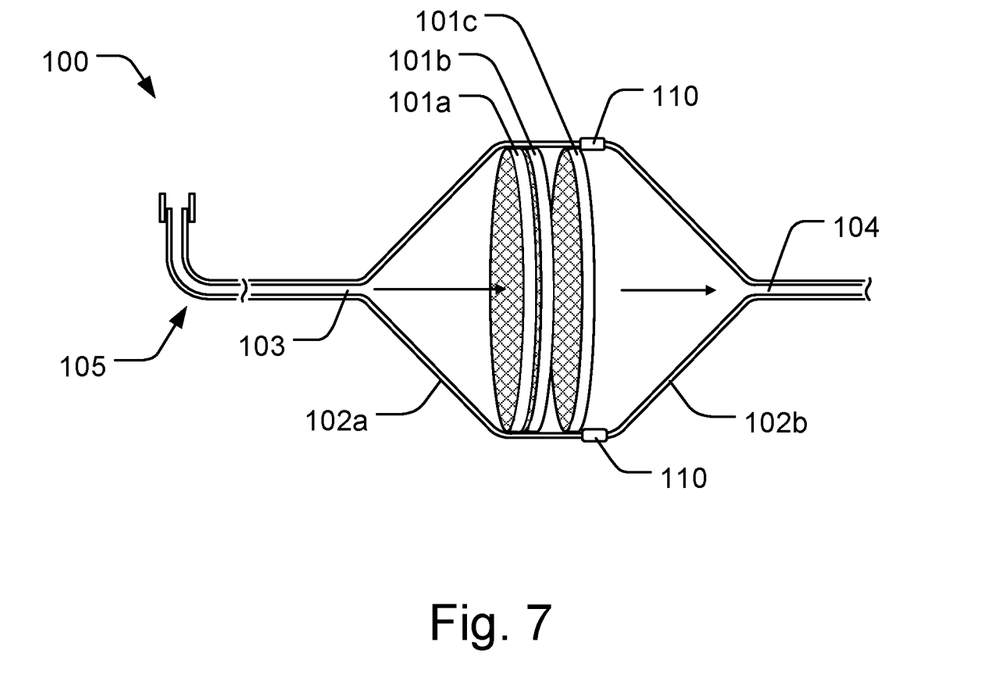
FIG. 7 is a schematic illustration, in a cross-sectional side view, of an apparatus for filtering amniotic fluid according to an example.

Turning again to the example of FIG. 6, the first filter element 101a may comprise a mesh having a mesh size in the range of 500-1000 µm, and the second filter element 101b may comprise a mesh having a mesh size in the range of 30-150 µm. The first filter element 101a may thus remove larger debris, with a diameter greater than 1 mm, such as hair or larger clumps of vernix, followed by removal of smaller particles with a diameter greater than 0.15 mm, with the second filter element 101b. This provides for a particularly effective filtering of particulate matter of varying size and reliable filtering of increased volumes over longer time periods since the risk of clogging is further minimized. As mentioned, any plurality of filter elements may be arranged in succession in the chamber 102. FIG. 7 shows an example where three filter elements 101a, 101b, 101c, are arranged in the chamber 102. In some examples the filter element having the smallest mesh or pore size, arranged furthest downstream in the chamber 102 may, such as filter element 101b in FIG. 6 and filter element 101c in FIG. 7, may have a mesh or pore size dimensioned so that only single amniotic cells or amniotic cell clumps smaller than 10 cells pass through the filter 101. The smallest mesh or pore size in such example may be approximately 30 µm. The filter 101 may comprise a mesh such as a nylon or polyester mesh.

The filter 101 may comprise a porous material having a variable pore size through the filter 101 in the direction of flow of the amniotic fluid from the fluid inlet 103 to the fluid outlet 104. The filter entry pore size may, for example, range from 500 to 2000 micrometers and the filter exit pore size may, for example, range from 30 to 150 micrometers. I.e. larger debris is removed at the surface of the filter 101 closest to the inlet 103 whereas particles of smaller size are removed deeper into the filter, as the amniotic fluid flows through the filter 101 in a direction towards the outlet 104 and the size of the pores get smaller.

As mentioned, the chamber 102 may comprise an upstream cavity 108 and a downstream cavity 109. The upstream and downstream cavities 108, 109, may be formed as an integrated piece to form the chamber 102, e.g. in a molding process or by other material forming techniques. The upstream and downstream cavities 108, 109, may be formed as separate units which are then connected to each other to form a sealing connection, e.g. by an adhesive or by welding. The filter 101 may be attached simultaneously or subsequently with such welding process or by the aforementioned adhesive. It is also conceivable that the upstream and downstream cavities 108, 109, may be releasably connectable to each other at a connecting element 110, to form a sealing connection, as schematically shown in FIG. 7. This provides for opening the chamber 102, e.g. for replacing the filter 101. This also allows connecting element 110 to be used to seal off and isolate the filter 101 within the chamber from the environment surrounding the chamber 102 such that there is no fluid communication between the amniotic fluid in the chamber 102 with said environment.

Connecting element 110 may comprise a screw fit, a bayonet fitting, one or more clamps, and/or one or more clips.

The filter 101 may thus be releasably connectable to the chamber 102. E.g. filter elements 101a, 101b, 101c, may be releasably connectable to the chamber 102 in FIG. 7. This provides for facilitated customization to different applications since filter elements 101a, 101b, 101c, of different pore or mesh size, or different number of such filter elements may be mounted in the chamber 102. The connecting element 110 is configured to form a sealing connection upstream and downstream cavities 108, 109, and may comprise an annular gasket extending around the periphery of the upstream and downstream cavities 108, 109. It is conceivable that the filter 101 may comprise a cartridge of different numbers of filter elements 101a, 101b, 101c, with different pore sizes that could be tailored to the particular amniotic fluid sample. For example, evaluation of the amniotic fluid turbidity and degree of milkyness (a sign of level of vernix both in particle size and opaqueness) could be an indicator of the appropriate filter cartridge to use. An accompanying chart for which to compare the amniotic fluid sample with could indicate which filter cartridge to use.

Figure 9:
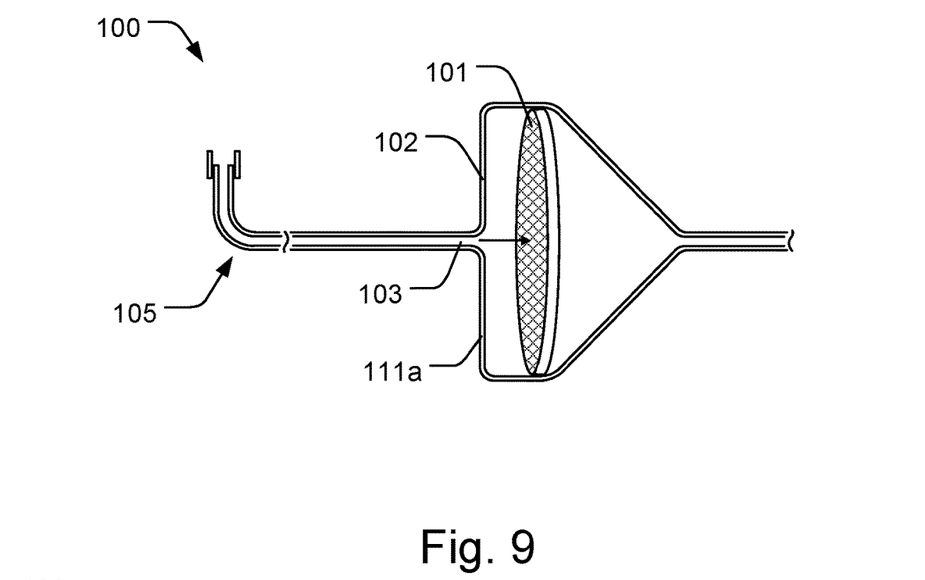
FIG. 9 is a schematic illustration, in a cross-sectional side view, of an apparatus for filtering amniotic fluid according to an example.

The upstream cavity 108 and/or the downstream cavity 109 may be funnel shaped. FIGS. 1-7 show examples where both the upstream and downstream cavities 108, 109, are funnel shaped. FIG. 9 shows an example where only the downstream cavity 109 is funnel shaped. Having a funnel shape may be advantageous for directing the flow of amniotic fluid along a desired vector of symmetry through the filter 101 and apparatus 100.

Figure 8:
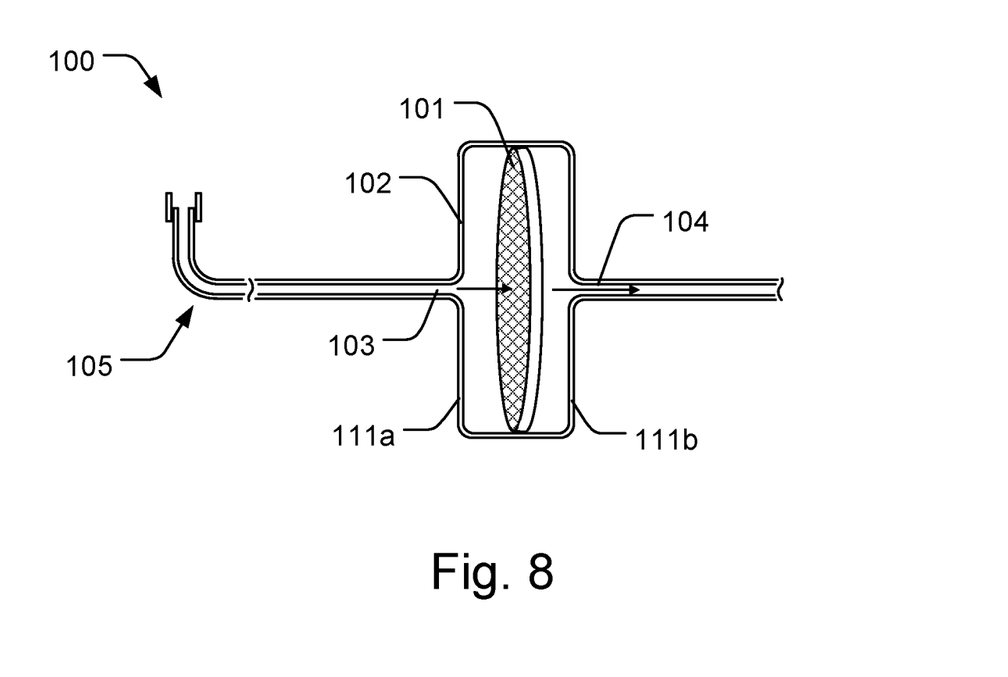
FIG. 8 is a schematic illustration, in a cross-sectional side view, of an apparatus for filtering amniotic fluid according to an example.

The upstream cavity 108 and/or the downstream cavity 109 may comprise a chamber wall 111a, 111b being arranged essentially in parallel with the filter 101, i.e. perpendicular to the direction of flow of the amniotic fluid from the fluid inlet 103 to the fluid outlet 104. FIG. 8 shows an example where chamber walls 111a, 111b, of the upstream and downstream cavities 108, 109 are arranged essentially in parallel with the filter 101. This may provide for minimizing the space inside the chamber 102, while maintaining adequate filter area, to minimize the risk of introducing e.g. air that may disturb surfactant molecules, reduce the risk of infection, and reduce detrimental formation of reactive oxygen species in the amniotic cells.

The chamber 102, and/or the inlet connector 105, and/or the outlet connector 106 may be formed from a phthalate free PVC material. This provides for an apparatus which is suitable to be in contact with pharmaceutical starting materials such as amniotic cells.

The apparatus 100 may comprise protrusions 112 arranged to extend from an inner wall 113 of the chamber 102. FIGS. 10a-b show examples of such protrusions 112, in a cross-sectional side view and through cross-section A-A respectively. The protrusions 112 provides support for the filter 101 in case the filter 101 would start bend and fold towards the inner wall 113. Thus, a flow through the mesh or pores of the filter 101 is still possible in such case since the filter 101 may be supported by the protrusions 112 at a distance from the inner wall 113. I.e. the protrusions 112 allows for further limiting the risk of flow restriction and provides for an efficient, robust and reliable filtering.

Figure 11:
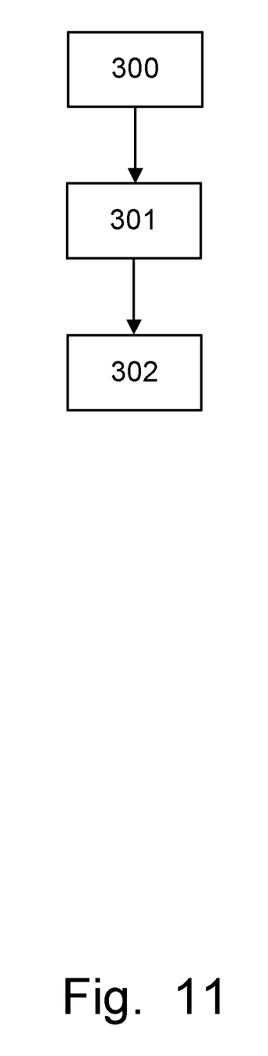
FIG. 11 is a flow chart of a method of filtering amniotic fluid according to one example.

FIG. 11 is a flow chart of a method 300 of filtering amniotic fluid containing particulate matter and amniotic cells. The method 300 comprises forming 301 a sealing connection between a fluid inlet 103 of a chamber 102 and an amniotic fluid sample source 201. The method 300 comprises passing 302 the amniotic fluid through a filter 101 enclosed in the chamber 102 by providing a flow of the amniotic fluid from the fluid inlet 103 to a fluid outlet 104 of the chamber 102. Particulate matter is thereby deposited on the filter 101 and the amniotic fluid containing amniotic cells flows through the outlet 104. The method 300 thus provides for the advantageous benefits as described in relation to apparatus 100 and FIGS. 1-10 above. The method 300 provides for effective and sterile filtration of the amniotic fluid to obtain amniotic cell samples of high quality.

From the description above follows that, although various embodiments of the invention have been described and shown, the invention is not restricted thereto, but may also be embodied in other ways within the scope of the subject-matter defined in the following claims.

The invention claimed is:

1. An apparatus for filtering amniotic fluid containing particulate matter and amniotic cells, the apparatus being formed of a pliable material and comprises
 a filter for filtering the particulate matter from the amniotic fluid,
 an expandable chamber enclosing the filter, wherein the filter is sealed within the chamber,
 wherein the chamber comprises a fluid inlet and a fluid outlet, and
 an inlet connector arranged to form a sealing connection between the fluid inlet and an amniotic fluid sample source, wherein, in use, the amniotic fluid is transported into the chamber to expand the chamber and pass the filter when flowing from the fluid inlet to the fluid outlet, whereby particulate matter is deposited on the filter and the amniotic fluid containing amniotic cells flows through the fluid outlet;
 wherein the filter comprises a mesh having a mesh size in the range of 100-500 µm.

2. The apparatus according to claim 1, comprising an outlet connector to form a sealing connection between the outlet and an amniotic cell-receiving device.

3. The apparatus according to claim 1, comprising a pump arranged to pressurize the amniotic fluid to flow from the fluid inlet to the fluid outlet.

4. The apparatus according to claim 3, wherein the pump arranged in communication with said conduit.

5. The apparatus according to claim 4, wherein the filter is arranged to divide the chamber into an upstream cavity of the chamber and a downstream cavity of the chamber, wherein the conduit is connected to the upstream cavity and the downstream cavity, wherein the pump is arranged to pressurize the amniotic fluid to flow from the upstream cavity to the downstream cavity, or to flow from the downstream cavity to the upstream cavity.

6. The apparatus according to claim 1, wherein the chamber comprises a conduit arranged between the fluid inlet and fluid outlet, wherein a pressure in the chamber is variable in response to fluid and/or gaseous communication through said conduit.

7. The apparatus according to claim 1, wherein the filter comprises a first filter element and a second filter element arranged between the first filter element and the fluid outlet, wherein the second filter element has a mesh or pore size which is smaller than a mesh or pore size of the first filter element.

8. The apparatus according to claim 7, wherein the first and second filter elements are separated by a distance (d) along a direction amniotic fluid flow from the fluid inlet to the fluid outlet.

9. The apparatus according to claim 1, wherein the filter is arranged to divide the chamber into an upstream cavity of the chamber and a downstream cavity of the chamber, wherein the upstream cavity, the downstream cavity and the filter are connected in a sealing connection by an adhesive or welding.

10. The apparatus according to claim 9, wherein the sealing connection has been formed by a simultaneous attachment of the upstream cavity, downstream cavity and the filter with an adhesive or welding.

11. The apparatus according to claim 1, wherein the filter is arranged to divide the chamber into an upstream cavity of the chamber and a downstream cavity of the chamber, wherein the upstream cavity and/or the downstream cavity is funnel shaped.

12. The apparatus according to claim 1, wherein the filter is arranged to divide the chamber into an upstream cavity of the chamber and a downstream cavity of the chamber, wherein the upstream cavity and the downstream cavity comprise chamber walls being arranged essentially in parallel with the filter, perpendicular to the direction of flow of the amniotic fluid from the fluid inlet to the fluid outlet.

13. The apparatus according to claim 1, wherein the filter is isolated by the chamber from the environment surrounding the chamber such that there is no fluid communication between the amniotic fluid in the chamber and the environment.

14. The apparatus according to claim 1, wherein the filter comprises a porous material having a variable pore size through the filter in the direction of flow of the amniotic fluid from the fluid inlet to the fluid outlet.

15. The apparatus according to claim 1, wherein the filter has a gradually decreasing mesh or pore size in the direction of flow of the amniotic fluid from the fluid inlet to the fluid outlet.

16. The apparatus according to claim 1, wherein the chamber and/or the inlet connector is formed from a phthalate free PVC material.

17. The apparatus according to claim 1, comprising protrusions arranged to extend from an inner wall of the chamber.

18. A method of filtering amniotic fluid containing particulate matter and amniotic cells, comprising
 forming a sealing connection between the fluid inlet of the expandable chamber of the pliable material and the amniotic fluid sample source of the apparatus according to claim 1,
 transporting the amniotic fluid into the chamber to expand the chamber and pass the amniotic fluid through the filter enclosed and sealed in the chamber by providing a flow of the amniotic fluid from the fluid inlet to a fluid outlet of the chamber, whereby particulate matter is deposited on the filter and the amniotic fluid flows through the fluid outlet containing amniotic cells.

19. An apparatus for filtering amniotic fluid containing particulate matter and amniotic cells, comprising
 a filter for filtering the particulate matter from the amniotic fluid,
 a chamber enclosing the filter,
 wherein the chamber comprises a fluid inlet and a fluid outlet, and
 an inlet connector arranged to form a sealing connection between the fluid inlet and an amniotic fluid sample source, wherein, in use, the amniotic fluid pass the filter when flowing from the fluid inlet to the fluid outlet, whereby particulate matter is deposited on the filter and the amniotic fluid containing amniotic cells flows through the fluid outlet;
 wherein the filter is isolated by the chamber from the environment surrounding the chamber such that there is no fluid communication between the amniotic fluid in the chamber and the environment.

20. The apparatus according to claim 19, wherein the filter comprises a mesh having a mesh size in the range of 100-500 µm.

* * * * *